United States Patent
Matsuoka

(10) Patent No.: US 8,479,252 B2
(45) Date of Patent: Jul. 2, 2013

(54) BROADCAST RECEPTION DEVICE

(75) Inventor: Ko Matsuoka, Aichi (JP)

(73) Assignee: Kyocera Corporation, Kyoto (JP)

( * ) Notice: Subject to any disclaimer, the term of this patent is extended or adjusted under 35 U.S.C. 154(b) by 1057 days.

(21) Appl. No.: 10/547,546

(22) PCT Filed: Mar. 1, 2004

(86) PCT No.: PCT/JP2004/002521
§ 371 (c)(1),
(2), (4) Date: Sep. 1, 2005

(87) PCT Pub. No.: WO2004/080066
PCT Pub. Date: Sep. 16, 2004

(65) Prior Publication Data
US 2006/0160576 A1    Jul. 20, 2006

(30) Foreign Application Priority Data

Mar. 5, 2003    (JP) .................................. 2003-058513

(51) Int. Cl.
*H04N 7/16*    (2011.01)
(52) U.S. Cl.
USPC ............. 725/139; 725/34; 725/110; 725/135; 725/136
(58) Field of Classification Search
USPC ........................................................ 725/139
See application file for complete search history.

(56) References Cited

U.S. PATENT DOCUMENTS

| | | | | |
|---|---|---|---|---|
| 5,479,408 A | * | 12/1995 | Will .............................. | 370/313 |
| 5,610,664 A | * | 3/1997 | Bobert .......................... | 348/564 |
| 6,459,906 B1 | | 10/2002 | Yang | |
| 6,519,771 B1 | * | 2/2003 | Zenith ............................ | 725/32 |
| 7,385,586 B2 | * | 6/2008 | Marshall et al. ............... | 345/156 |
| 2001/0012025 A1 | * | 8/2001 | Wojaczynski et al. ........ | 345/856 |
| 2002/0008883 A1 | * | 1/2002 | Shibata ........................ | 358/1.15 |
| 2002/0078447 A1 | * | 6/2002 | Mizutome et al. .............. | 725/37 |
| 2002/0149699 A1 | | 10/2002 | Mizobuchi et al. | |
| 2003/0097659 A1 | * | 5/2003 | Goldman ........................ | 725/89 |
| 2004/0034694 A1 | * | 2/2004 | Brown et al. .................. | 709/207 |
| 2004/0098754 A1 | * | 5/2004 | Vella et al. .................... | 725/135 |
| 2004/0152449 A1 | * | 8/2004 | Koshihara .................. | 455/412.1 |

FOREIGN PATENT DOCUMENTS

| | | |
|---|---|---|
| EP | 1 248 459 A2 | 10/2002 |
| EP | 1 248 459 A3 | 10/2002 |
| EP | 1248459 A2 * | 10/2002 |
| JP | 04-280535 | 10/1992 |

(Continued)

OTHER PUBLICATIONS

Supplementary European Search Report dated Mar. 30, 2006.

(Continued)

*Primary Examiner* — Robert Hance
(74) *Attorney, Agent, or Firm* — Duane Morris LLP

(57) ABSTRACT

When electronic mail is arrived while digital broadcasting is being viewed in a portable receiving terminal (2), a process for automatically opening the electronic mail, or a process for opening the electronic mail according to an instruction by a user is to be carried out. In addition, when the process for opening the electronic mail is thus carried out while a video obtained by receiving broadcast is being displayed, a process for switching to a display screen for an electronic mail content (body text) is not carried out. Instead, the video obtained by receiving broadcast is remained displayed, and the content (body text) obtained as a result of opening the electronic mail, too, is displayed by an OSD function within the same screen (liquid crystal display panel 202).

16 Claims, 2 Drawing Sheets

FOREIGN PATENT DOCUMENTS

| | | |
|---|---|---|
| JP | 5-60050 | 8/1993 |
| JP | 11-177714 | 7/1999 |
| JP | 11177714 A * | 7/1999 |
| JP | 2002-044536 | 2/2002 |
| JP | 2002-077327 | 3/2002 |
| JP | 2002-112139 | 4/2002 |
| JP | 2002112139 A * | 4/2002 |
| JP | 2002-185881 | 6/2002 |
| JP | 2002197033 A * | 7/2002 |
| JP | 2002-314646 | 10/2002 |
| JP | 2002-342244 | 11/2002 |
| JP | 2002-351799 | 12/2002 |
| JP | 2002-353915 | 12/2002 |

OTHER PUBLICATIONS

Translation of Examiner's Answer on Appeal from JP 2003-58513, mailed Jul. 14, 2009, 5 pages.

Notification of Reasons for Refusal for JP 2003-58513, mailed Dec. 8, 2009, with English translation.

JP 2010-0244244 Office Action mailed Aug. 28, 2012.

* cited by examiner

BROADCAST RECEPTION DEVICE

TECHNICAL FIELD

The present invention relates to a broadcast receiver for receiving a broadcast wave.

BACKGROUND ART

In a digital broadcasting system, information on programs, and others are added to a video and an audio, and these video and audio are compressed on a broadcast station side. The compressed video and audio are multiplexed based on MPEG (Moving Picture Experts Group) so as to create a transport stream which is digitally modulated, and transmitted. Then, on a receiver side, a received digitally modulated signal is demodulated so as to create the transport stream which is separated into the video, the audio and other information, and analyzed, as a result, the program and others are provided to a user.

Furthermore, in a portable information terminal, there has been proposed a terminal provided with two functions, that is, one function for sending and receiving electronic mail, and the other function for receiving the digital broadcasting (see Japanese Patent laying-open No. 2002-353915).

As a prior art, in a portable telephone provided with the function for sending and receiving the electronic mail, in a case that another function is activated when receiving the electronic mail, it is possible to execute receiving the electronic mail, although an operation of the other function needs to be stopped in order to browse the electronic mail. In addition, in the portable information terminal disclosed in the above Patent laying-open, no specific disclosure is made regarding how to improve convenience regarding a relationship between a browsing of the text of the electronic mail and a viewing of the broadcast.

SUMMARY OF THE INVENTION

In view of the above circumstances, it is an object of the present invention to provide a broadcast receiver capable of improving convenience regarding a relationship between a browsing of the text of the electronic mail and a viewing of the broadcast.

In order to solve the above problem, a broadcast receiver of the present invention is a broadcast receiver for receiving broadcast and displaying a video on a screen, and comprises a means for receiving electronic mail via a communications network. When a process for opening the electronic mail is carried out while a video obtained by receiving broadcast is being displayed, the video obtained by receiving broadcast is remained displayed, and a content obtained as a result of opening the electronic mail, too, is displayed by an on-screen display function within the same screen.

With the above configuration, even when a process for opening electronic mail is carried out while a broadcast viewing function is being activated, the broadcast viewing function is not stopped, but remained functioned, and a content obtained as a result of opening the electronic mail, too, is to be displayed by an on-screen display function on the same screen. This function allows a user to browse a body text of the electronic mail while continuing viewing the broadcast.

The broadcast receiver may be configured such that the content obtained as a result of opening the electronic mail is displayed in such a manner as to be superimposed on the video obtained by receiving broadcast. In addition, in such the configuration, a broadcast receiver may be configured such that the content obtained as a result of opening the electronic mail is displayed using translucent text. On the other hand, a broadcast receiver may also be so configured as to carry out a process for reducing a picture size of the video obtained by receiving broadcast, and display the content obtained as a result of opening the electronic mail in extra space of the screen which is created as a result of the picture size being reduced.

The broadcast receiver may be configured such that the content obtained as a result of opening the electronic mail is scroll-displayed on the screen. According thereto, it is possible to decrease an influence on the video obtained by receiving broadcast as much as possible by reducing an area occupied by a display of the content of the electronic mail.

The broadcast receiver may be configured to comprise a means for registering a mail address, and a means for determining whether or not arrived electronic mail is electronic mail from a registered mail address. Regarding only the electronic mail from the registered mail address, the content obtained as a result of opening the electronic mail, too, is displayed within the same screen while the video obtained by receiving broadcast is remained displayed.

The broadcast receiver may be configured such that it is possible to be selected by a user setting whether or not to display, besides the video obtained by receiving broadcast being remained displayed, the content obtained as a result of opening the electronic mail, too, within the same screen. In addition, the broadcast receiver may be so configured to generate an alarming sound for informing of receiving the electronic mail in a case that the video obtained by receiving broadcast is remained displayed, and the content obtained as a result of opening the electronic mail, too, is displayed within the same screen.

BEST MODE FOR PRACTICING THE INVENTION

Hereinafter, an embodiment of the present invention will be described based on FIG. 1 and FIG. 2.

Figure 1:
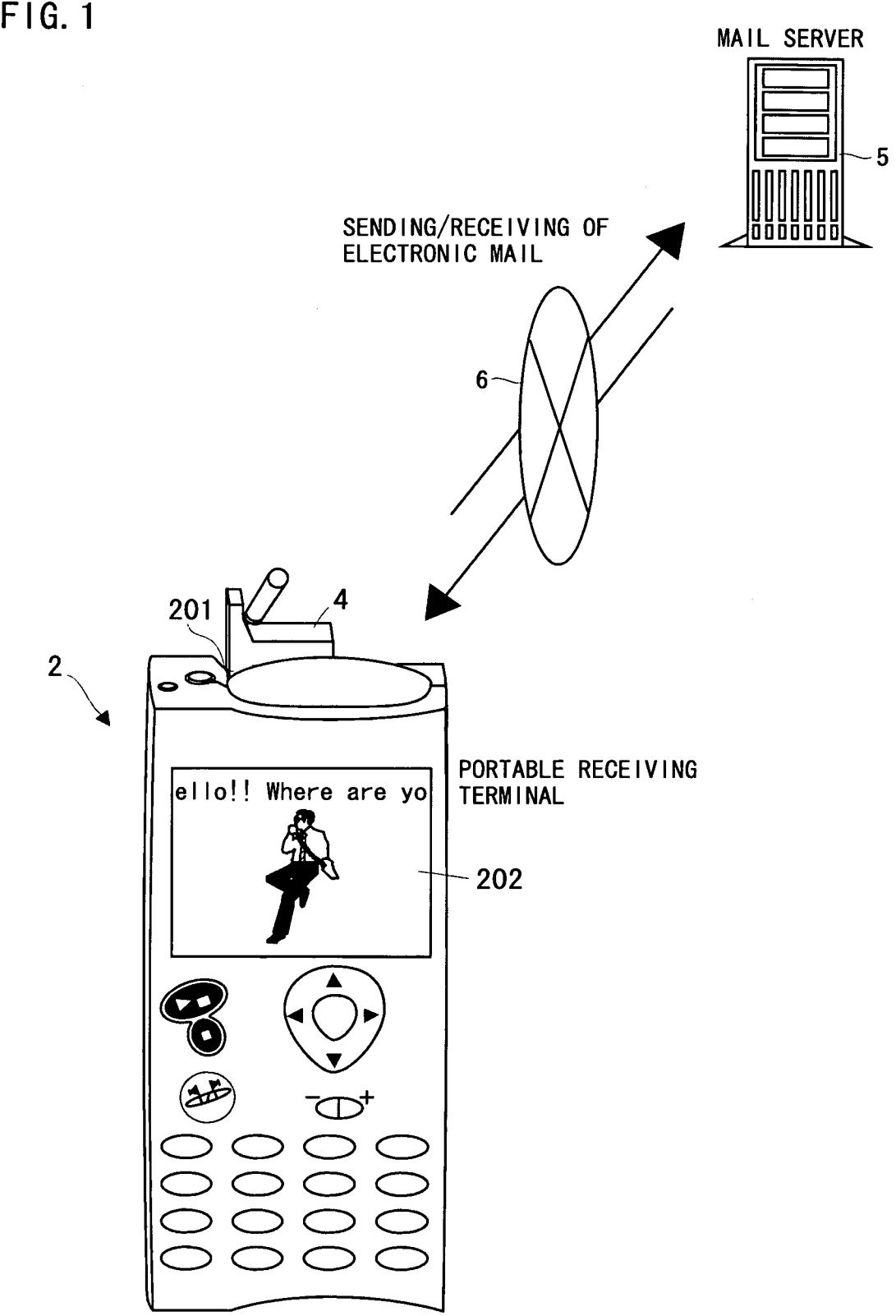
FIG. 1 is a system outline illustrating a broadcast receiver, a mail server, and others, of an embodiment of the present invention.
Figure 2:
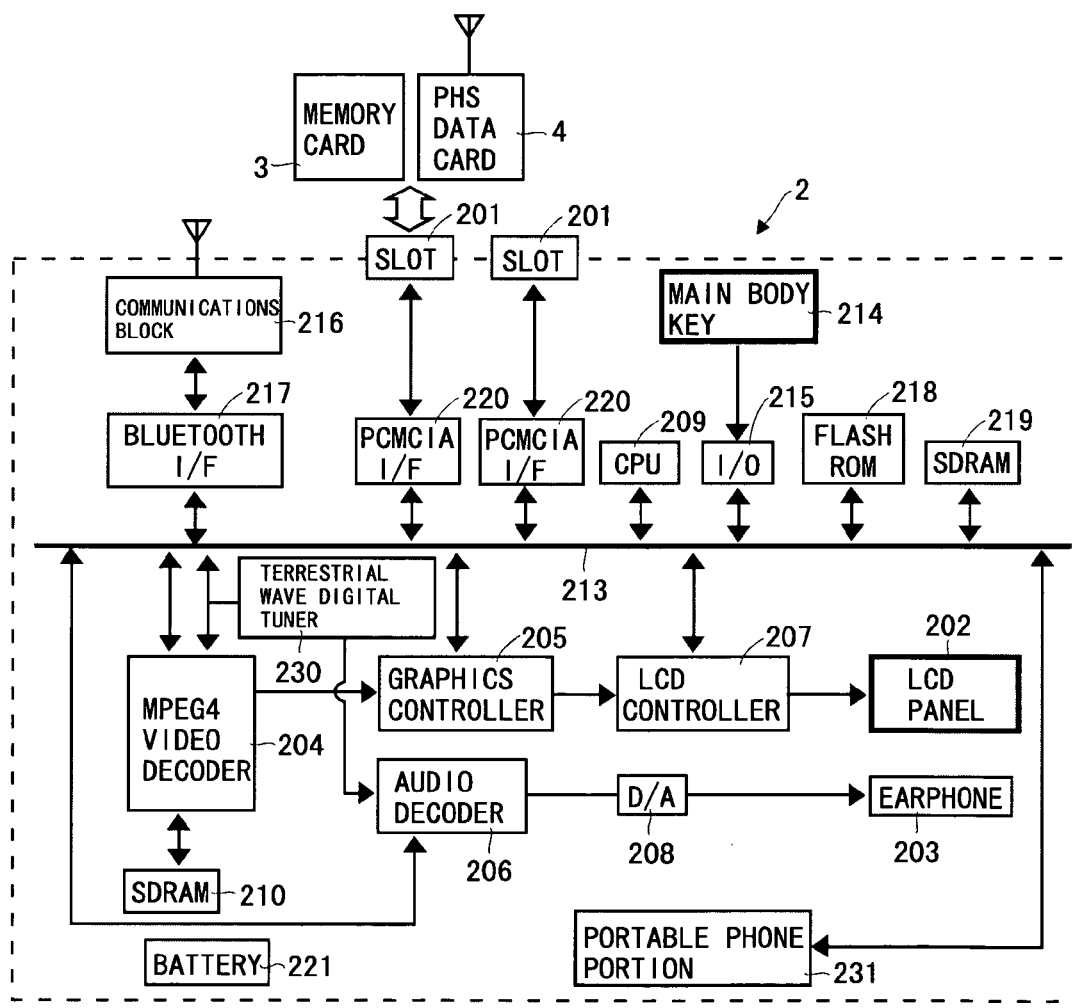
FIG. 2 is a block diagram showing a portable receiving terminal of an embodiment of the present invention.

As shown in FIG. 1, a portable receiving terminal 2 has a shape of a portable telephone, for example, and as shown in FIG. 2, is driven by a battery 221. By coded video-audio data obtained as a result of a terrestrial wave digital tuner 230 receiving broadcast, or by coded video-audio data read out from a memory card 3, and others, inserted to a slot 201, the portable receiving terminal 2 displays a video on a liquid crystal display panel 202, and outputs an audio from an earphone 203. Operation buttons (play/pause, stop, forward, volume, and others) regarding viewing, and a numeric keypad, and others are provided on a main body of the portable receiving terminal 2. It is noted that in this embodiment, the coded video-audio data are MPEG-4 data.

The MPEG-4 data read out from the memory card 3 is supplied to an MPEG-4 video decoder 204 via a PCMCIA interface 220 and a system bus 213. Furthermore, the tuner 230 for receiving terrestrial digital broadcasting extracts bit stream data that comply with an MPEG 4 standard broadcast in this terrestrial digital broadcasting, and applies this bit stream data to the MPEG-4 video decoder 204 and an audio decoder (MPEG-4-AAC) 206.

The MPEG-4 video decoder 204 decodes the bit stream data that comply with the MPEG 4 standard so as to evaluate a quantization coefficient and a motion vector, and supplies to a graphics controller 205 video data obtained by carrying out an inverse DCT conversion, a motion compensation control based on the motion vector, and others. The graphics controller 205 subjects the video data (R, G, B data, for example) to processes for adjusting colors, and so on. In addition, the graphics controller 205 carries out an OSD (on-screen display) process for displaying, on the liquid crystal display panel 202, text and others (an operation button, a menu screen, an EPG screen formed of program information obtained from terrestrial digital broadcasting, text which is a content of electronic mail, and others) that a CPU 209 instructs to output. The audio decoder 206 decodes audio coded data in the bit stream so as to create audio data. An SDRAM 210 is utilized for the above-described process of the MPEG-4 video decoder 204.

An LCD controller 207 drives the liquid crystal display panel 202 based on the video data supplied from the graphics controller 205. In addition, a D/A converter 208 receives the audio data output from the audio decoder 206, and carries out a D/A (digital to analog) conversion so as to create analog signals for a right (R) audio and a left (L) audio. These signals are applied to the earphone 203.

A main-body key 214 corresponds to the above-described operation button regarding the viewing (play/pause, stop, forward), the numeric keypad, and others. Operation information toward this main-body key 214 is applied to the CPU 209 via an interface 215, and a system bus 213. The CPU 209 executes necessary processes based on the above-described operation information.

Furthermore, in order to render a close-range wireless network available, a communications block (a wireless LAN block, and others) 216 and an interface 217 are provided. Furthermore, a flash ROM 218 and an SDRAM 219 are also provided. The battery 221 is a secondary battery, and obtains and accumulates power supplied from a battery charger not shown. A portable telephone portion 231 is used as an ordinary telephone.

The CPU 209 carries out various processes such as a process for the wireless network, a data transmitting and receiving (an Internet connection process, an electronic-mail transmitting and receiving process, and others) by a PHS data card 4 inserted into the slot 201, a process for controlling each functional portion based on the received data, a reading/writing control of the Flash ROM 218 and the SDRAM 219, and others.

Herein, if electronic mail is received while broadcast is viewed in the portable receiving terminal 2, a process for opening this electronic mail automatically, or a process for opening the electronic mail according to an instruction by a user is to be carried out. Then, when thus carrying out the process for opening the electronic mail while a video obtained by receiving broadcast is being displayed, a process for switching to a display screen for a content (body text) of the electronic mail is not carried out. Instead, the video obtained by receiving broadcast is remained displayed, and the content obtained as a result of opening the electronic mail, too, is displayed by the OSD function within the same screen (within the liquid crystal display panel 202). For example, electronic mail received by the PHS data card 4 is supplied to the CPU 209 via the PCMCIA interface 220 and the system bus 213. The CPU 209 stores a mail title written in a header portion of the electronic mail, sender information (a mail address), and character data which is body text of the electronic mail, into a predetermined memory, and manages these data. Then, when carrying out the above-described process for opening the electronic mail, the CPU 209 reads out the character data, which is the body text of the electronic mail, from the memory, and instructs the graphics controller 205 to display the character in an OSD function. The graphics controller 205 lists on an OSD plane the character data, which is the body text of the electronic mail, combines this data and a video obtained by receiving broadcast plane, and outputs the combined data.

In a combining and outputting process described above, it is possible to display the content obtained as a result of opening the electronic mail in such a manner as to be superimposed on the video obtained by receiving broadcast, and in this embodiment, the content is displayed using translucent characters (or text) as display characters (or text).

In addition, the graphics controller 205 is capable of carrying out a process for reducing a picture size of the video obtained by receiving broadcast (a scaling process), and creates a size changing screen (a moving video plane) and creates an OSD plane so that the content obtained as a result of opening the electronic mail is displayed in extra space of the screen as a result of the picture size being reduced.

Furthermore, the graphics controller 205 is also capable of scroll-displaying the content obtained as a result of opening the electronic mail on the screen. Herein, in digital broadcasting, a subtitle service is offered, and in this subtitle service, it is possible to scroll-display subtitle characters (or text) at a predetermined speed. Regarding a display of the content of the electronic mail, different from the subtitle, it is not needed to synchronize with a displayed video, and therefore, the moving video plane of the video obtained by receiving broadcast and scroll characters (or text) plane such as subtitle characters (or text) may be created and combined so as to display the video. The scroll speed is a previously determined scroll speed, or a scroll speed instructed by the user. In addition, it may be possible that every time that the user depresses a predetermined button, characters (or text) are scrolled.

Furthermore, as described above, the CPU 209 stores the mail title written in the header portion of the electronic mail, the sender information (a mail address), the character data, which is the body text of the electronic mail, in a predetermined memory and manages these data, and is capable of determining whether or not the arrived electronic mail is sent from a previously registered user by comparing the mail address registered in advance by the user and the mail address (sender information) of the arrived electronic mail. Regarding a function for registering the mail addresses, an existing (known) function may be used. When it is instructed by the user to carry out the process in which the received video is being displayed, and at the same time, the body text of the electronic mail is displayed regarding only the electronic mail from the previously registered address, the CPU 209 carries out the above-described determining process so as to determine whether or not to carry out the process for displaying the body text of the electronic mail. According thereto, it becomes possible to look through only the electronic mail from a predetermined sender while the broadcast video is viewed, and it is possible to prevent the viewing of the broadcast from being obstructed by unimportant electronic mail, for example.

A menu screen is displayed on the liquid crystal display panel 202 of the portable receiving terminal 2, and an item for an "electronic mail display setting" is prepared thereon. If an item such as "display only the electronic mail of the registered address in addition to the received video YES/NO" is displayed when the item is selected, it becomes possible to carry out the above-described user setting. In addition, by preparing a selection item such as "display the body text of the electronic mail in addition to the received video YES/NO", it becomes possible for the user to switch between turning on and off of none other than the function for displaying the body text in addition to the received video.

Furthermore, the CPU 209 may use a buzzer or a melody producer not shown so as to produce an alarming sound informing the user of receiving the electronic mail when the body text of the electronic mail and the received video are displayed at the same time.

It is noted that although a mail reception is performed via the PHS data card 4 in the above-described description, this is not always the case. It is also possible to receive the electronic mail via the portable telephone portion 231, and others, for example. In addition, as the broadcast receiver, besides the portable receiving terminal, this broadcast receiver may be configured to be a fixed-type receiver.

As described above, according to the present invention, the body text of the electronic mail is displayed on the display screen of the video obtained by receiving broadcast, so that it is possible to browse the body text of the electronic mail while the broadcast viewing is being continued.

What is claimed is:

1. A broadcast receiver for receiving broadcast and displaying a video on a screen, comprising:
   a broadcast receiving section for receiving a broadcast wave;
   a display controller for displaying a video on the screen;
   a memory for registering an electronic mail address; and
   an electronic mail receiving section for receiving an electronic mail, including a header portion, an electronic mail address and body text, via a communication network regardless of whether or not its electronic mail address is registered in advance in the memory,
   wherein in a case where an electronic mail is received by the electronic mail receiving section and its electronic mail address is registered in advance in the memory, the display controller simultaneously displays on the screen a content, including only the body text read out of the electronic mail, obtained as a result of opening the received electronic mail and the received broadcast video which is being displayed,
   wherein in a case where the electronic mail address is not registered in advance in the memory, the electronic mail is stored in a predetermined memory and is operable by a user's instruction,
   wherein when the content obtained as a result of opening the electronic mail is displayed on the screen, the content is scroll-displayed at a predetermined scroll speed, and
   wherein while a process for reducing a picture size of the video obtained by receiving broadcast is carried out, the content obtained as a result of opening the electronic mail is displayed in an extra space of the screen, wherein the extra space is created as a result of the picture size being reduced, and wherein only the body text read out of the electronic mail is displayed in the extra space.

2. A broadcast receiver according to claim 1, wherein the content obtained as a result of opening the electronic mail is displayed in such a manner as to be superimposed on the video obtained by receiving broadcast.

3. A broadcast receiver according to claim 2, wherein the content obtained as a result of opening the electronic mail is displayed using translucent text.

4. A broadcast receiver according to any one of claims 1 to 3, wherein it is possible to select by a user setting whether or not to display the video which is being displayed and the content obtained as a result of opening the electronic mail, within the same screen.

5. A broadcast receiver according to any one of claims 1 to 3, wherein an alarming sound for informing of receiving the electronic mail is generated in a case that the video which is being displayed and the content obtained as a result of opening the electronic mail are displayed within the same screen.

6. A broadcast receiver according to claim 1, wherein the predetermined scroll speed is a speed specified by a user's instruction.

7. A portable receiver, comprising:
   a display for displaying a video;
   an electronic mail receiver for receiving electronic mail, including a header portion, an electronic mail address and body text, via a communications network; and
   display controller for controlling the display for displaying information included in an electronic mail, including only the body text read out of the electronic mail, together with a displayed video in a case that a prescribed condition is satisfied and for not displaying the information included in the electronic mail together with the displayed video in a case that the prescribed condition is not satisfied when receiving the electronic mail while displaying video,
   wherein in the case where the prescribed condition is not satisfied and therefore the information included in the electronic mail is not displayed together with the displayed video, the electronic mail is stored in a predetermined memory and is openable by a user's instruction,
   wherein in a case that the prescribed condition is satisfied, it is possible to select by a user setting whether or not to display the video which is being displayed along with the information included in the electronic mail, within the same screen,
   wherein when the content obtained as a result of opening the electronic mail is displayed on the screen, the content is scroll-displayed at a predetermined scroll speed, and
   wherein while a process for reducing a picture size of the video obtained by receiving broadcast is carried out, the content obtained as a result of opening the electronic mail is displayed in an extra space of the screen, wherein the extra space is created as a result of the picture size being reduced, and wherein only the body text read out of the electronic mail is displayed in the extra space.

8. A portable receiver according, to claim 7, further comprising a memory for storing mail addresses, wherein said prescribed condition is that the mail address of the electronic mail received is stored in the memory.

9. A portable receiver according to claim 7, wherein the predetermined scroll speed is a speed specified by a user's instruction.

10. A broadcast receiver for receiving broadcast and displaying a video on a display, comprising:
   a broadcast receiving section for receiving a broadcast wave;
   a display controller for displaying a video on the display;
   a memory for registering an electronic mail address; and
   an electronic mail receiving section for receiving, an electronic mail, including a header portion, an electronic mail address and body text, via a communication network regardless of whether or not its electronic mail address is registered in advance in the memory,
   wherein the display controller controls the display for displaying information included in an electronic mail, including only the body text read out of the electronic mail, together with a displayed video in a case that a prescribed condition is satisfied and for not displaying the information included in the electronic mail together with the displayed video in a case that the prescribed condition is not satisfied when receiving the electronic mail while displaying video, wherein in the case where the prescribed condition is not satisfied, the electronic mail is stored in a predetermined memory and is operable by a user's instruction, wherein in a case that the prescribed condition is satisfied, it is possible to select by a user setting whether or not to display the video which is being displayed along with the information included in an electronic mail, within the same screen, wherein said prescribed condition is that the mail address of the electronic mail received is stored in the memory, wherein when the content obtained as a result of opening the electronic mail is displayed on the screen, the content is scroll-displayed at a predetermined scroll speed, and wherein while a process for reducing a picture size of the video obtained by receiving broadcast is carried out, the content obtained as a result of opening the electronic mail is displayed in an extra space of the screen, wherein the extra space is created as a result of the picture size being reduced, and wherein only the body text read out of the electronic mail is displayed, in the extra space.

11. A broadcast receiver according to claim 10, wherein the predetermined scroll speed is a speed specified by a user's instruction.

12. A broadcast receiver for receiving broadcast and displaying a video on a screen, comprising:
   a broadcast receiving section for receiving a broadcast wave;
   a display controller for displaying a video on the screen;
   a memory for registering an electronic mail address;
   an electronic mail receiving section for receiving an electronic mail, including a header portion, an electronic mail address and body text, via a communication network regardless of whether or not its electronic mail address is registered in advance in the memory, wherein in a case where an electronic mail is received by the electronic mail receiving section and its electronic mail address is registered in advance in the memory, the display controller simultaneously displays on the screen a content obtained as a result of opening the received electronic mail, including only the body text read out of the electronic mail, and the received broadcast video which is being displayed, wherein in a case where the electronic mail address is not registered in advance in the memory, the electronic mail is stored in a predetermined memory and is openable by a user's instruction; and an alarming portion generating an alarming sound in a case that the video which is being displayed along with the content obtained as a result of opening the electronic mail are displayed within the same screen, wherein when the content obtained as a result of opening the electronic mail is displayed on the screen, the content is scroll-displayed at a predetermined scroll speed, and wherein while a process for reducing a picture size of the video obtained by receiving broadcast is carried out, the content obtained as a result of opening the electronic mail is displayed in an extra space of the screen, wherein the extra space is created as a result of the picture size being reduced, and wherein only the body text read out of the electronic mail is displayed in the extra space.

13. A broadcast receiver according to claim 12, wherein the content obtained as a result of opening the electronic mail is displayed in such a manner as to be superimposed on the video obtained by receiving broadcast.

14. A broadcast receiver according to claim 13, wherein the content obtained as a result of opening the electronic mail is displayed using translucent text.

15. A broadcast receiver according to any one of claims 12 to 14, wherein the content obtained as a result of opening the electronic mail is scroll-displayed on the screen.

16. A broadcast receiver according to claim 12, wherein the predetermined scroll speed is a speed specified by a user's instruction.

* * * * *